United States Patent
Suzuki et al.

(10) Patent No.: US 6,801,671 B1
(45) Date of Patent: Oct. 5, 2004

(54) CONTROLLED IMAGE DETERIORATION CORRECTION DEVICE WITH REDUCTION/ENLARGEMENT

(75) Inventors: Hiroyuki Suzuki, Toyokawa (JP);
Hideaki Mizuno, Toyokawa (JP);
Hideyuki Toriyama, Toyokawa (JP);
Nobuo Kamei, Toyokawa (JP);
Tsuyoshi Yoneyama, Toyokawa (JP)

(73) Assignee: Minolta Co., Ltd., Osaka (JP)

( * ) Notice: Subject to any disclaimer, the term of this patent is extended or adjusted under 35 U.S.C. 154(b) by 751 days.

(21) Appl. No.: 09/711,936

(22) Filed: Nov. 15, 2000

(30) Foreign Application Priority Data

Nov. 18, 1999 (JP) ............................................. 11-328129

(51) Int. Cl.⁷ ............................. G06K 9/36; H04N 1/393
(52) U.S. Cl. ........................ 382/275; 382/300; 358/1.2; 358/1.9; 358/525; 358/528; 358/451
(58) Field of Search ................................. 382/300, 299, 382/298, 275; 358/1.2, 1.9, 525, 528, 451

(56) References Cited

U.S. PATENT DOCUMENTS

| | | | |
|---|---|---|---|
| 5,189,529 A | * 2/1993 | Ishiwata et al. | 358/451 |
| 5,299,029 A | * 3/1994 | Moriya et al. | 358/447 |
| 5,579,417 A | * 11/1996 | Sakano | 382/298 |
| 5,828,794 A | * 10/1998 | Katayama et al. | 382/298 |
| 5,867,634 A | 2/1999 | Hirota et al. | |
| 5,868,666 A | 2/1999 | Okada et al. | |
| 6,603,885 B1 | * 8/2003 | Enomoto | 382/263 |

FOREIGN PATENT DOCUMENTS

| | | | |
|---|---|---|---|
| JP | 08149283 A | * 6/1996 | H04N/1/393 |
| JP | 10-271080 | 10/1998 | |
| JP | 11-112753 | 4/1999 | |
| JP | 11-164139 | 6/1999 | |
| JP | 11-317887 | 11/1999 | |

OTHER PUBLICATIONS

Machine Translation of JP 11–112753, Apr. 23, 1999.*
Machine Translation of JP 11–164139, Jun. 18, 1999.*
Machine Translation of JP 11–317887, Nov. 16, 1999.*

* cited by examiner

*Primary Examiner*—Bhavesh M. Mehta
*Assistant Examiner*—Christopher Sukhaphadhana
(74) *Attorney, Agent, or Firm*—Burns, Doane, Swecker & Mathis, L.L.P.

(57) ABSTRACT

An image processing device for processing input image data includes a correction unit that corrects for image deterioration caused by changes in image magnification; a reduction/enlargement unit that, based on the magnification, thins out the pixel data when reduction is being performed or carries out inflation of the pixel data when enlargement is being performed; and a controller that changes the operation of the correction unit in response to the magnification. The image processing device further includes a first selector that sends input pixel data to the reduction/enlargement unit when enlargement is being performed, and sends pixel data from the correction unit to the reduction/enlargement unit when reduction is being performed; a second selector that sends pixel data from the reduction/enlargement unit to the correction unit when enlargement is being performed, and sends input pixel data to the correction unit when reduction is being performed; and a third selector that outputs pixel data from the correction unit when enlargement is being performed, and outputs pixel data from the reduction/enlargement unit when reduction is being performed.

14 Claims, 7 Drawing Sheets

CONTROLLED IMAGE DETERIORATION CORRECTION DEVICE WITH REDUCTION/ENLARGEMENT

CROSS-REFERENCE TO RELATED APPLICATIONS

This application is based on application No. 11-328129 filed in Japan on Nov. 18, 1999, the contents of which is hereby incorporated herein by reference.

BACKGROUND OF THE INVENTION

1. Field of the Invention

The present invention pertains to an image processing device that processes digital image data, and more particularly to an image processing device that changes the magnification of images.

2. Description of the Related Art

When performing image formation, the magnification of the input image may be electrically changed in accordance with the magnification ratio in an image processing device. When the image is enlarged, the pixel data is inflated. For example, when the magnification is 2.0, the same pixel data is output twice in succession. When this is done, the image deteriorates due to jaggedness. When the image is reduced, the pixel data is thinned out. For example, where the magnification is 0.5, the pixel data is output for every other pixel. When this is done, the image deteriorates due to data loss. As a result, in order to prevent deterioration in the quality of the image, correction of the image data is performed for both enlargement and reduction. This correction is termed 'interpolation' below.

In a conventional image processing device, the magnification processing circuit has (i) a reducing interpolation unit that carries out interpolation of the input pixel data when reduction is to be performed, (ii) a reduction/enlargement unit that carries out thinning out or inflation of the pixels, and (iii) an enlarging interpolation unit that carries out interpolation of the input pixel data when enlargement is to be performed. The reducing interpolation unit, the reduction/enlargement unit and the enlarging interpolation unit are controlled based on the magnification information supplied by the CPU.

In the case of reduction, in order to prevent such processing from causing a deterioration in image quality, after interpolation of the pixel data is carried out by the reducing interpolation unit in accordance with the reduction ratio, the interpolated pixel data is thinned out by the reduction/enlargement unit and the image is reduced. In the case of enlargement, after the pixel data is inflated by the reduction/enlargement unit in accordance with the magnification and the image is enlarged, interpolation of the inflated pixel data is carried out by the enlarging interpolation unit in order to prevent the enlargement processing from causing deterioration of the image quality.

As described above, the conventional magnification processing circuit requires separate and independent interpolation circuits for enlargement and reduction in order to prevent image deterioration after the magnification processing. As a result, the size of the circuitry increases, thereby increasing the cost of the device.

OBJECTS AND SUMMARY

An object of the present invention is to provide a small magnification processing circuit.

In order to achieve this and other objects, an image processing device comprising a first aspect of the present invention comprises a device that has a variable circuit construction and includes (i) a correction unit that corrects for image deterioration caused by changes in image magnification, (ii) a reduction/enlargement unit that, based on the magnification, thins out the pixel data when reduction is being performed or carries out inflation of the pixel data when enlargement is being performed, and (iii) a controller that changes the operation of the correction unit in response to the magnification.

An image processing device comprising a second aspect of the present invention includes (i) a correction unit comprising a device that has a variable circuit construction so that it functions as a reduction correction circuit when reduction is being performed and functions as an enlargement correction circuit when enlargement is being performed, (ii) a reduction/enlargement unit that thins out the pixel data when reduction is being performed and inflates the pixel data when enlargement is being performed, and (iii) a controller that changes the operation of the correction unit so that it functions as a reduction correction circuit when reduction is being performed and functions as an enlargement correction circuit when enlargement is being performed.

Embodiments of the present invention also may have the characteristics described below.

The image processing device may have a first selector that outputs input pixel data to the reduction/enlargement unit when enlargement is being performed, and outputs pixel data from the correction unit to the reduction/enlargement unit when reduction is being performed, a second selector that outputs pixel data from the reduction/enlargement unit to the correction unit when enlargement is being performed, and outputs input pixel data to the correction unit when reduction is being performed, and a third selector that outputs pixel data from the correction unit when enlargement is being performed, and outputs pixel data from the reduction/enlargement unit when reduction is being performed.

The controller may change the operation of the correction unit so that when reduction is being performed it will function as a reduction correction circuit to correct image deterioration caused by the thinning out of the pixel data, and when enlargement is being performed it will function as an enlargement correction circuit to correct image deterioration caused by inflation of the pixel data.

The reduction correction circuit may comprise a filter circuit in which the parameters are changed in accordance with the reduction ratio.

The enlargement correction circuit may have multiple types of filter circuits, and the filter used may be selected in accordance with the enlargement ratio.

The correction unit may comprise a filter circuit in which the parameters may be changed in accordance with the magnification.

The correction unit may be comprised of a field programmable gate array.

BRIEF DESCRIPTION OF THE DRAWINGS

These and other objects, advantages and features of the invention will become apparent from the following description thereof taken in conjunction with the accompanying drawings which illustrate specific embodiments of the invention.

In the following description, like parts are designated by like reference numbers throughout the several drawings.

DESCRIPTION OF THE PREFERRED EMBODIMENTS

The embodiments of the present invention will be explained below with reference to the attached drawings. In the drawings, identical symbols refer to identical or similar components.

Figure 1:
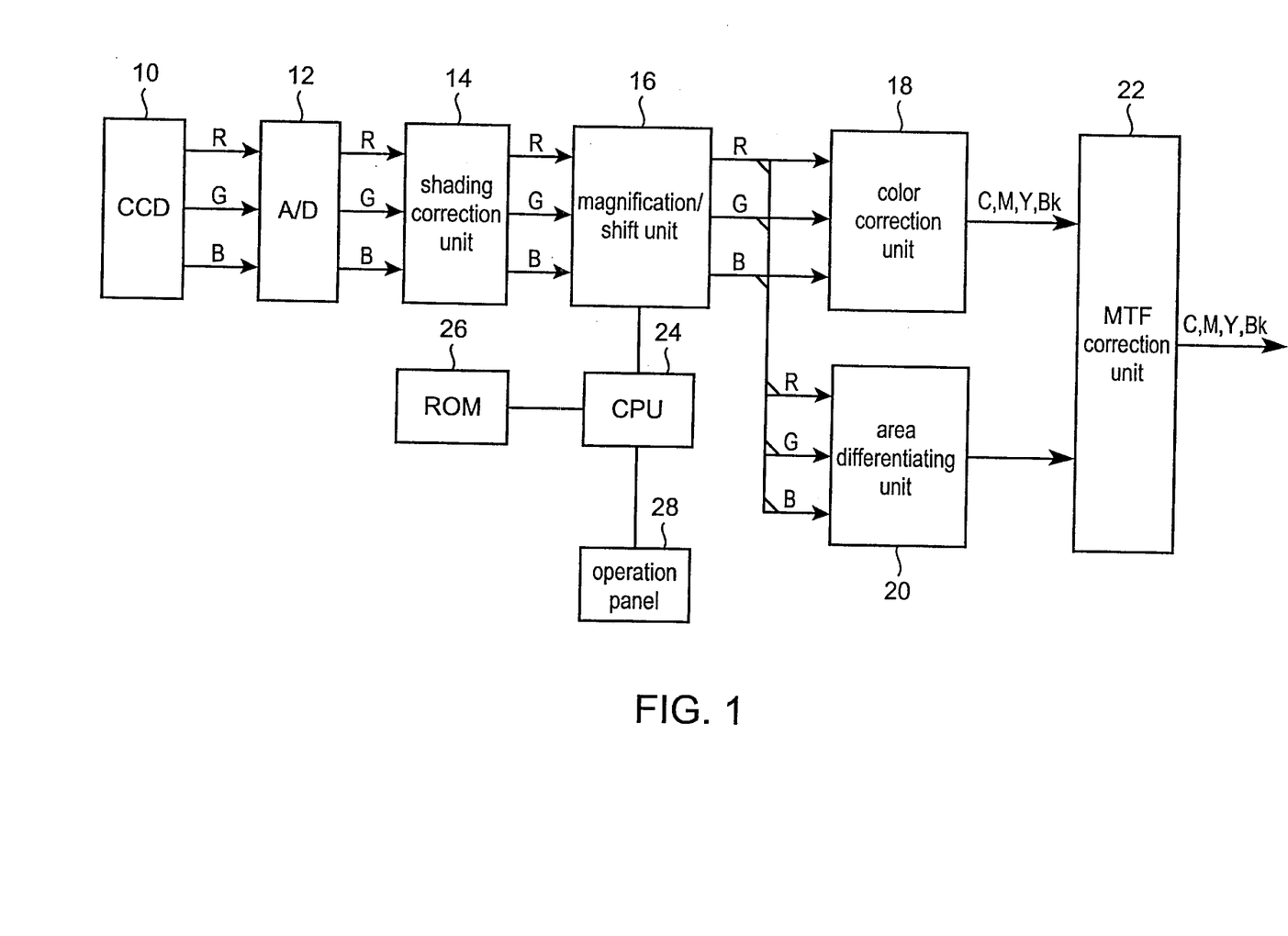
FIG. 1 is a block diagram showing the construction of a color image processing circuit according to one embodiment of the present invention.

FIG. 1 shows the construction of a color image processing circuit. Red, green and blue output signals from the color CCD sensor 10 comprising a three-color line sensor are each converted into digital signals by the A/D conversion unit 12. The red (R), green (G) and blue (B) digital image data thus obtained is corrected by the shading correction unit 14 and then simultaneously input to the magnification/position shifting unit 16. The magnification/position shifting unit 16 comprises three identical processing circuits, and performs magnification processing and magnification/position shifting through the application of identical algorithms to each set of color data. The data from the magnification/position shifting unit 16 is converted by the color correction unit 18 into the colors of cyan (C), magenta (M), yellow (Y) and black (Bk), and the various areas are differentiated by the area differentiating unit 20. The MTF correction unit 22 corrects the image data output from the color correction unit 18 and outputs it to the printer based on the results of differentiation performed by the area differentiating unit 20. The CPU 24 changes the various circuit settings regarding the magnification/position shifting unit 16 based on the processing circuit program residing in the ROM 26. This changes the operation of the magnification/position shifting unit 16 as well as the applicable processing algorithm. The image processing parameters such as the magnification ratio, etc., are set by the user by means of the operation panel 28.

Figure 2:
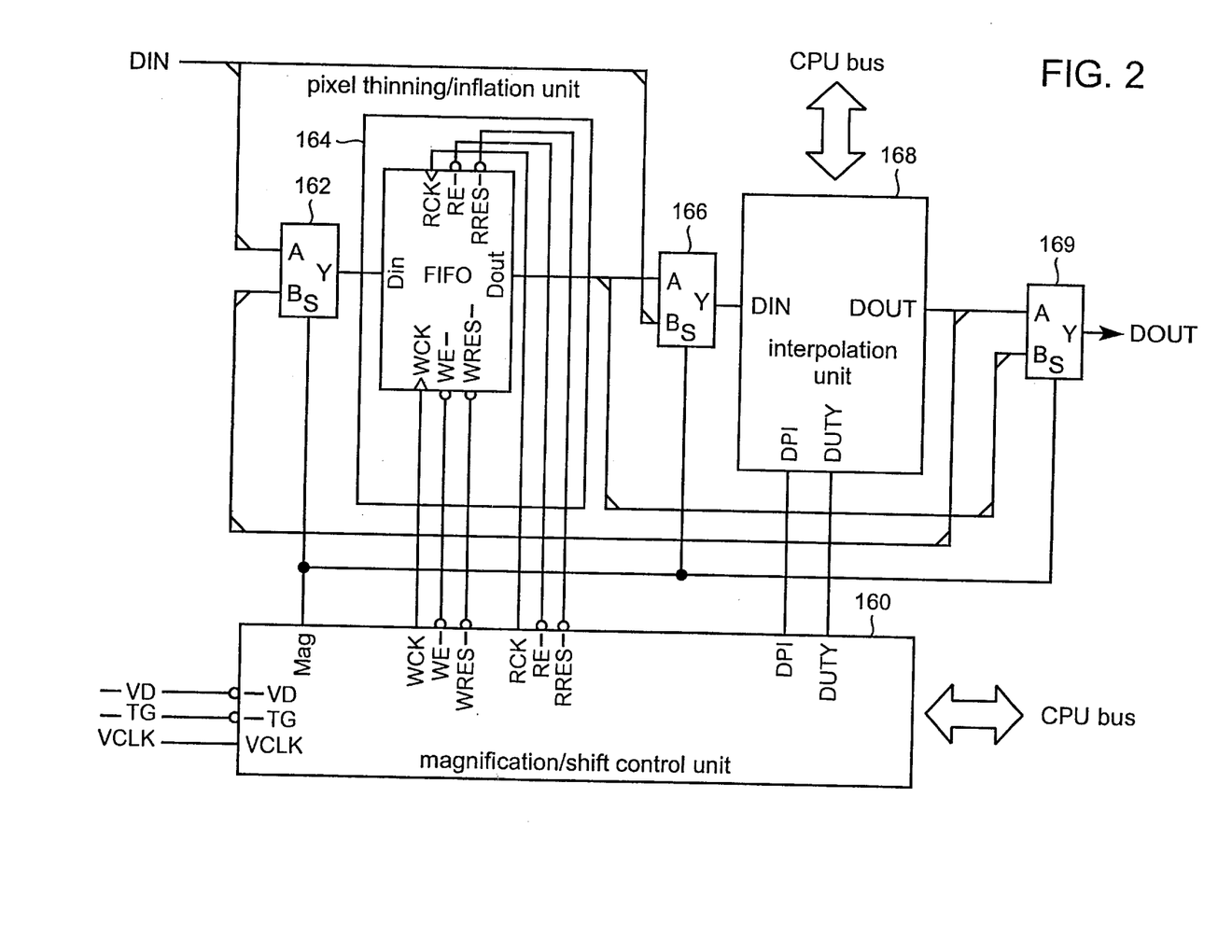
FIG. 2 is a block diagram of a magnification/position shifting unit.

FIG. 2 shows the construction of a processing circuit in the magnification/position shifting unit 16 with respect to image data of one color. The magnification/position shifting unit 16 has three of these processing circuits, i.e., one for each color. The magnification/position shifting unit 16 comprises a device in which the circuit construction or operation may be rewritten, such as a field programmable gate array (FPGA), and its processing algorithms are changed by the CPU 24 based on the magnification. The various circuit settings for the magnification/position shifting unit 16 are changed by the CPU 24 based on the processing circuit program stored in the ROM 26.

The magnification/position shifting unit 16 comprises a pixel thinning/inflation unit 164 comprising a FIFO memory, an interpolation unit 168 in which the operation or circuit construction may be changed by the CPU 24, selectors 162, 166 and 169, and a magnification/position shifting control unit 160. The magnification/position shifting control unit 160 is connected to the CPU 24 via the CPU bus, and controls the thinning/inflation unit 164, the interpolation unit 168 and the selectors based on the magnification information from the CPU 24.

The interpolation unit 168 is a circuit to correct image deterioration caused by image magnification. The interpolation unit 168 is connected to the CPU 24 via the CPU bus, and its operation or circuit construction is changed by the CPU 24.

The interpolation unit 168 is set by the CPU 24 to function as an enlarging interpolation circuit when enlargement is being performed, and it is set by the CPU 24 to function as a reducing interpolation circuit when reduction is being performed. In the pixel thinning/inflation unit 164, the write clock and read clock regarding the FIFO memory are controlled by the magnification/position shifting control unit 160, and the thinning or inflation of the pixel data are carried out. Furthermore, the position of the image may be shifted by controlling the image data output timing, but explanation of this shifting process is omitted below.

The magnification operation will now be explained. As used herein "magnification" may refer to either reduction or enlargement.

Where reduction is carried out based on the magnification information from the CPU bus, Mag='H' (reduction) is output by the magnification/position shifting control unit 160 to the selectors 162, 166 and 169 as a selection signal, and interpolation circuit information for reduction is set in the interpolation unit 168 by the CPU 24. When this is done, each selector selects input B. Input image data DIN is first input to the interpolation unit 168 via the selector 166, and the interpolation unit 168 carries out reducing interpolation of the input image data DIN. After undergoing reducing interpolation, the data is input to the pixel thinning/inflation unit (reduction/enlargement unit) 164 via the selector 162, and the image data is thinned. The thinned image data is then output via the selector 169.

Figure 3:
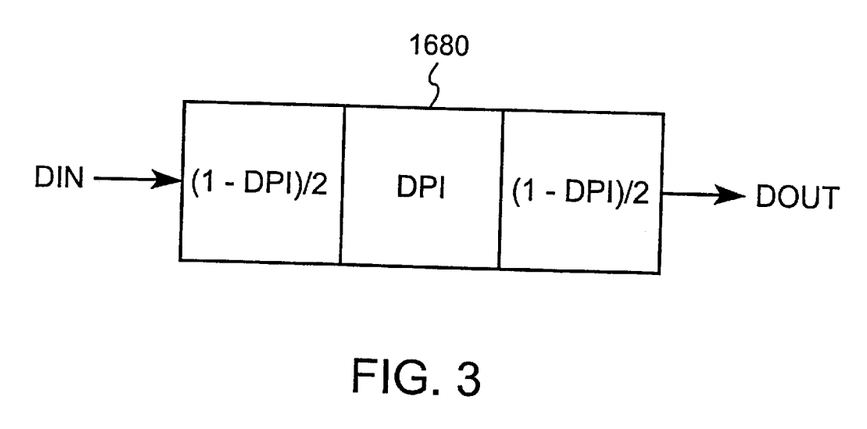
FIG. 3 is a drawing showing the nature of the processing performed when the interpolation unit functions as a reducing interpolation unit.

FIG. 3 shows the nature of the processing carried out when the interpolation unit 168 is operated as a reducing interpolation unit. The magnification/position shifting unit 160 sets the magnification (reduction ratio) as an interpolation coefficient DPI in the reducing interpolation unit. For example, where the magnification is 0.50 or 0.33, the interpolation coefficient DPI is 0.50 or 0.33, respectively. During reducing interpolation, the input image data for continuous three pixels is stored in a memory, calculation is performed by the conversion filter 1680, and the obtained image data DOUT is output. This conversion filter 1680 multiplies the data regarding the subject pixel by a magnification of DPI, based on the interpolation coefficient DPI, and multiplies the data regarding the adjacent pixels by (1−DPI)/2 and adds the results to the calculation result for the subject pixel data. Through this processing, where image reduction is performed by thinning the pixels, the information regarding the pixels lost due to thinning is distributed to other pixels. Through this processing, image deterioration due to loss of pixel data may be prevented.

Where enlargement is carried out based on the magnification information from the CPU bus, Mag='L' (enlargement) is output by the magnification/position shifting control unit 160 to the selectors 162, 166 and 169 as a selection signal, and interpolation circuit information for enlargement is set in the interpolation unit 168 by the CPU 24. When this is done, each selector selects input A. Input image data DIN is first input to the pixel thinning/inflation unit 164 via the selector 162, and image data is inflated. The inflated data is then input to the interpolation unit 168 via the selector 166, and the interpolation unit 168 carries out enlarging interpolation of the inflated image data. The image data that has undergone enlarging interpolation is then output via the selector 169.

Figure 4:
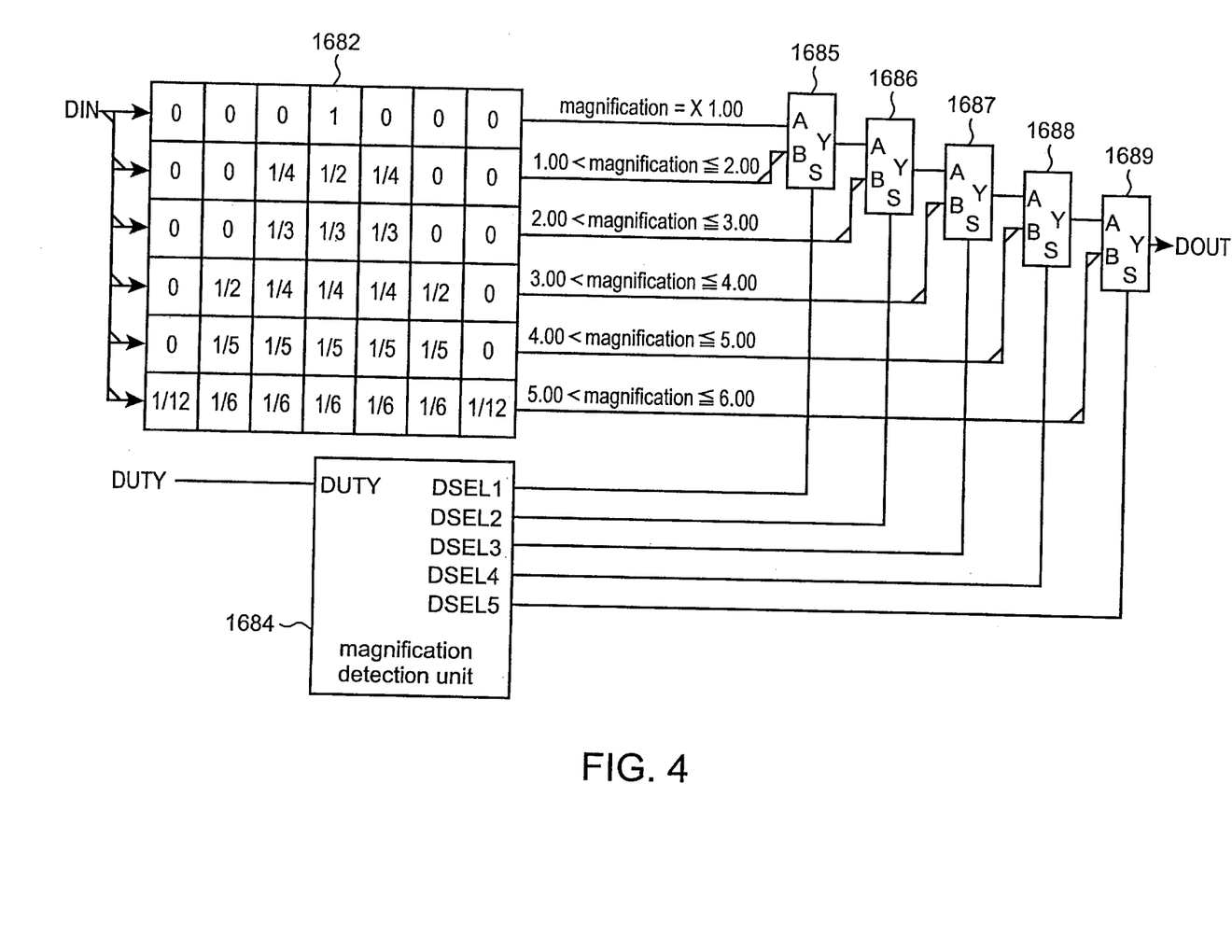
FIG. 4 is a drawing showing the nature of the processing performed when the interpolation unit functions as an enlarging interpolation unit.

FIG. 4 shows the nature of the processing carried out when the interpolation unit 168 is operated as an enlarging interpolation unit. In the enlarging interpolation unit, the image data DIN for continuous seven pixels that was inflated by the pixel thinning/inflation unit 164 is stored in a memory, and calculation is performed by the six types of filters 1682 as shown in the drawing. In this calculation, one calculation result from among the calculation results from the six types of filters is chosen in accordance with the magnification. When the magnification is 1.0, the data for the subject pixel is output as is. When the magnification is larger than 1.0 but smaller than or equal to 3.0, output data is obtained by performing convolution using the coefficients shown in FIG. 4 based on the data for the three pixels, i.e., the subject pixel and its adjacent pixels. Where the magnification is larger than 3.0 but smaller than or equal to 5.0, output data is obtained by performing convolution using the coefficients shown in FIG. 4 based on the data for the five pixels, i.e., the subject pixel and the four pixels before and after the subject pixel. Where the magnification is larger than 5.0 but smaller than or equal to 6.0, output data is obtained by performing convolution using the coefficients shown in FIG. 4 based on the data for the seven pixels, i.e., the subject pixel and six pixels before and after the subject pixel.

The six types of interpolation data obtained in the processes described above are input to the selectors 1685, 1686, 1687, 1688 and 1689, selection is made by means of the selection signal from among DSEL1 through DSEL5 output by the magnification detection unit 1684, and output data DOUT is thereby obtained. The magnification detection unit 1684 performs selection signal control in accordance with the inflation ratio (magnification ratio). As used herein, "duty" refers to the magnification level. The duty is output by the magnification/position shifting control unit 160.

For example, if the duty is greater than 1.0 and less than or equal to 2.0, signal DSEL1 selects B in selector 1685, and signals DSEL2, DSEL3, DSEL4, and DSEL5 each select A in respective selectors 1686, 1687, 1688, and 1689. As a result, the output of the second filter (0, 0, ¼, ½, ¼, 0, 0) is output as DOUT. By means of this process, interpolation is carried out in accordance with the enlargement ratio. The purpose of this process is to eliminate image jaggedness occurring as a result of the pixel inflation. By means of this process, a smoother enlarged image may be obtained.

As described above, the operation of the interpolation unit 168 is changed by the CPU 24 depending on whether it functions as a reducing interpolation unit or as an enlarging interpolation unit. Specifically, the interpolation unit 168 should be constructed such that the reducing interpolation circuit shown in FIG. 3 and the enlarging interpolation circuit shown in FIG. 4 are built into the interpolation unit 168, and switching between the two is performed by the CPU 24 in accordance with the magnification ratio. It is also acceptable if one filter circuit is built into the interpolation unit 168, and the parameters of this filter are changed by the CPU 24 in accordance with the magnification ratio. In this way, the size of the circuit board may be further reduced.

Figure 5:
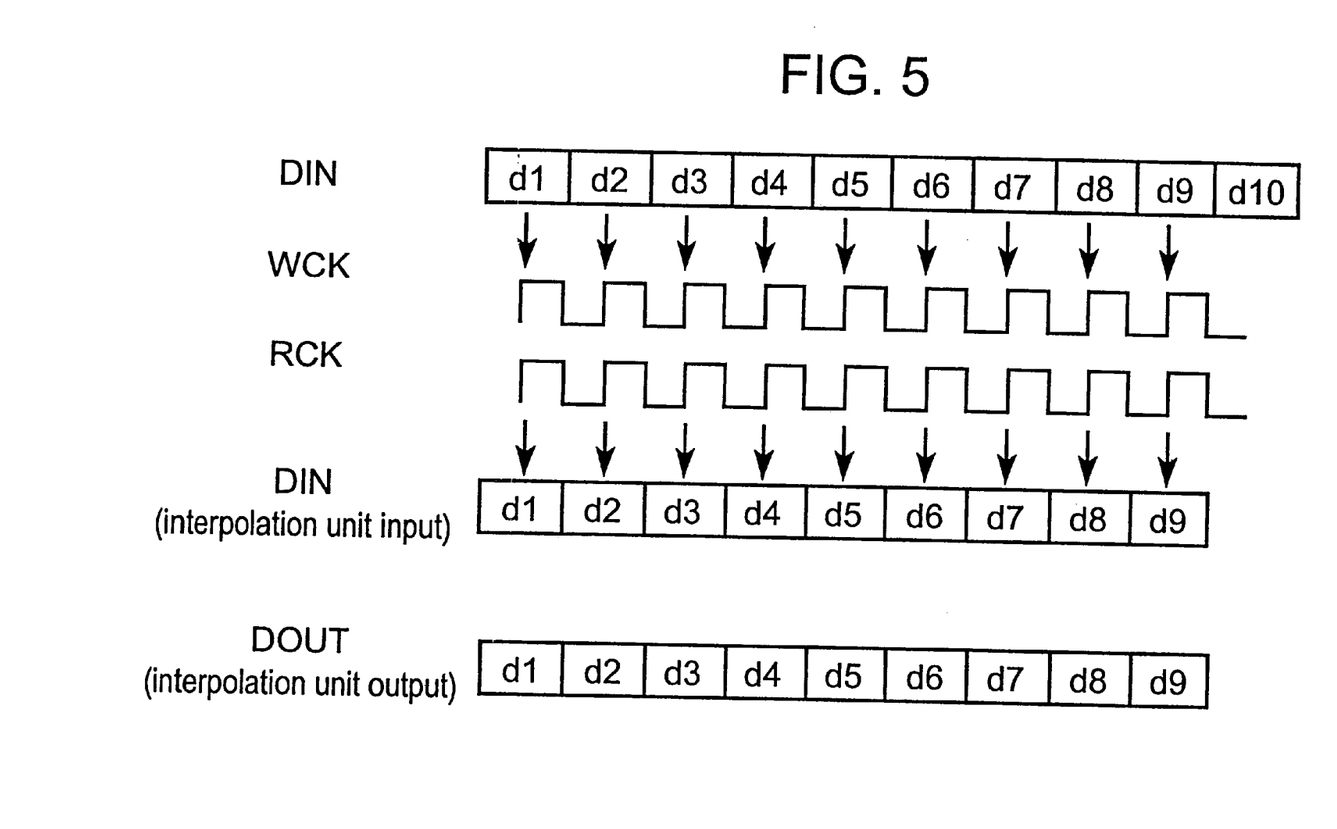
FIG. 5 is a control timing chart for the magnification/position shifting unit during normal magnification.
Figure 6:
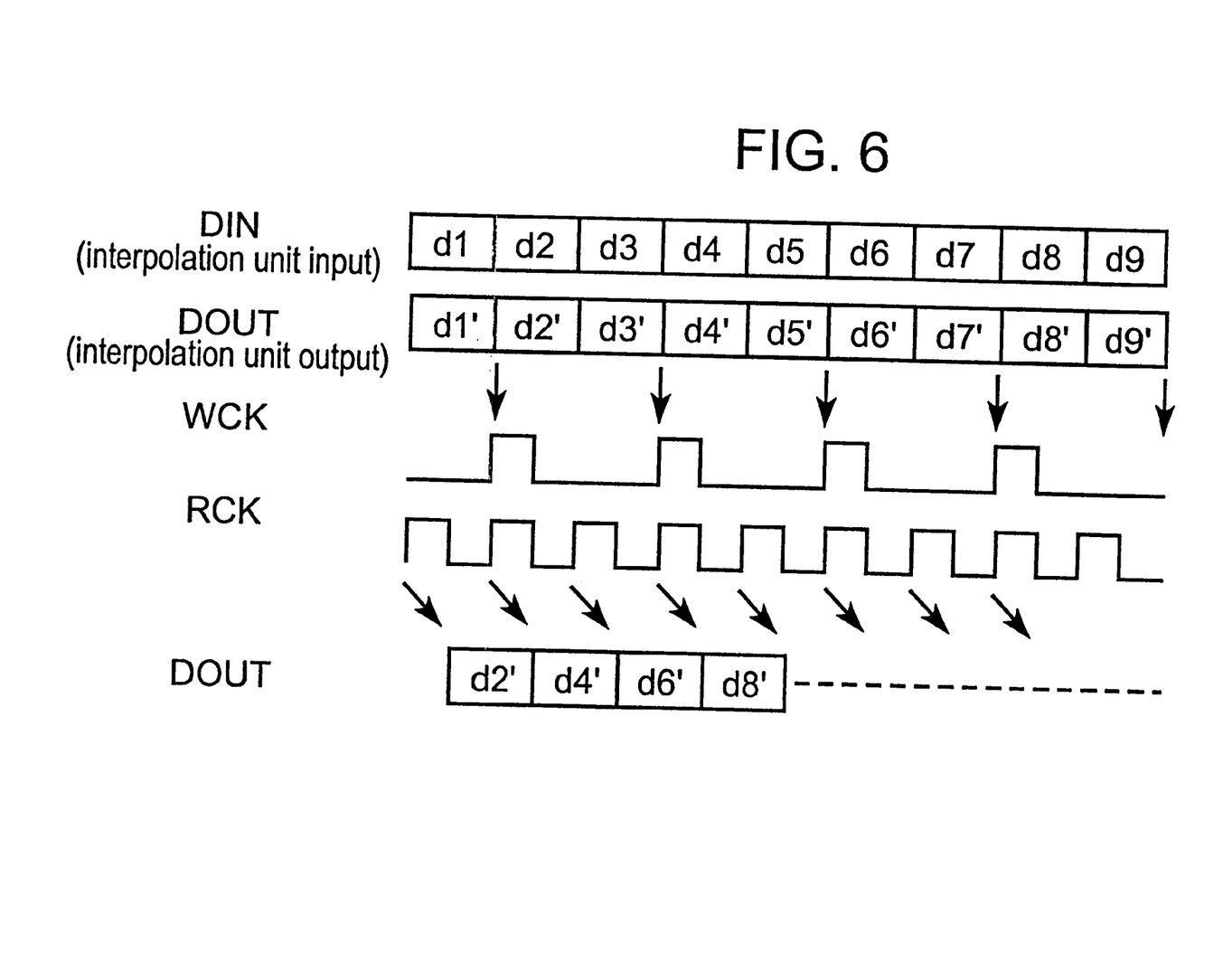
FIG. 6 is a control timing chart for the magnification/position shifting unit during reduction (0.5).
Figure 7:
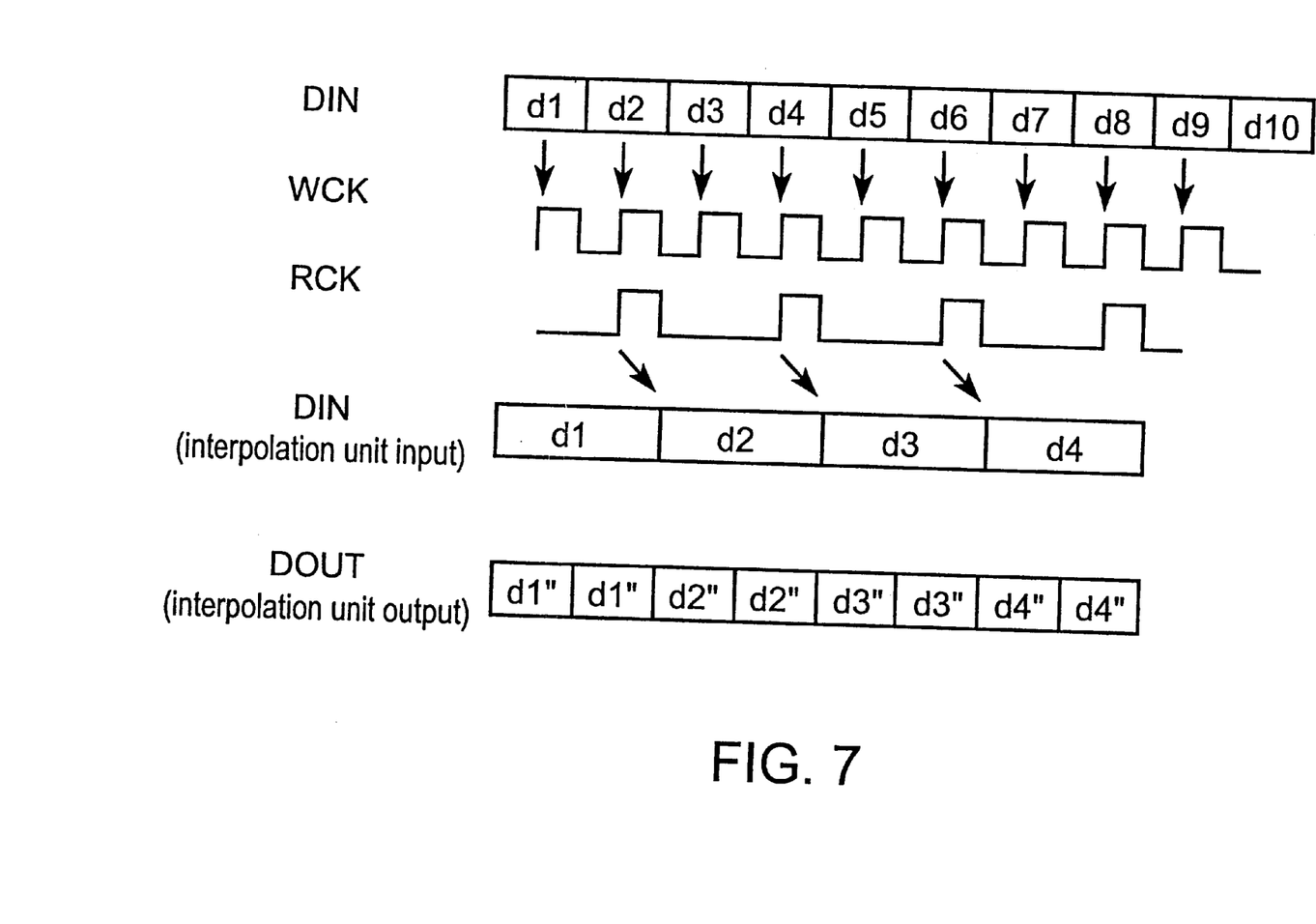
FIG. 7 is a control timing chart for the magnification/position shifting unit during enlargement (2.0).

FIGS. 5, 6 and 7 show the control timings in the magnification/position shifting unit 16 where the magnification is set to normal, reduction (0.50 magnification) and enlargement (2.00 magnification), respectively. The FIFO memory of the pixel thinning/inflation unit 164 is controlled based on the thinning clock (write clock) wck and the inflation clocks (read clocks) rck, -we, -wres and -rres output from the magnification/position shifting control unit 160. WCK controls the timing of writing Din into the FIFO, and RCK controls the timing of reading data Dout from the FIFO. WE is the "write enable" signal indicating the completion of writing data into the FIFO. WRES is the "writing address reset" signal. RE is the "read enable" signal indicating the completion of reading data out of the FIFO. RRES is the "reading address reset" signal. VCLK is a pixel clock timing signal. (The minus sign in front of the symbols is a negative logic signal.) WCK and RCK are generated based on VCLK. And, VD controls an inputted image area of an image in the sub-scanning direction of a scanner. When VD is "L", image data is inputted from the scanner. TG is a horizontal synchronizing signal for inputting image data from the scanner.

Here, in the case of normal magnification as shown in FIG. 5, pixel thinning and inflation are not performed, nor is interpolation. In the case of reduction (0.50 magnification) as shown in FIG. 6, pixel thinning (reduction processing) to thin out the pixel data is performed after reducing interpolation is performed. The thinning clock wck is output based on a cycle twice as long as the normal pixel clock, and pixel data for every other pixel is written to the FIFO memory. In the case of enlargement (2.00 magnification) as shown in FIG. 7, enlarging interpolation is performed after pixel inflation (enlargement processing), in which the pixel data is inflated, is performed. The inflation clock wck is output based on a cycle twice as long as the normal pixel clock, and the same pixel data is output twice in succession.

Through the embodiment described above, one interpolation unit can be used to perform for enlargement or reduction, which do not occur simultaneously. As a result, the size of the substrate for the image processing circuit can be made smaller, and the cost may be reduced.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be constructed as being included therein.

What is claimed is:

1. An image processing device for processing input image data including a plurality of pixel data, the device comprising:

a correction unit that corrects for image deterioration caused by chances in image magnification;

a reduction/enlargement unit that, based on the magnification, thins out the pixel data when reduction is being performed or carries out inflation of the pixel data when enlargement is being performed; and a controller that changes the operation of the correction unit in response to the magnification, further comprising a selector switch for controlling a flow of the input image data, wherein when the image magnification is reduction processing, the input image data is sent to the correction unit first and then to the reduction/enlargement unit, and when the image magnification is enlarging processing, the input image data is sent to the reduction/enlargement unit first and then to the correction unit.

2. The image processing device of claim 1, wherein the selector switch includes a first selector which sends the input image data to the correction unit when the image magnification is reduction processing, and a second selector which sends the input image data to the reduction/enlargement unit when the image magnification is enlarging processing.

3. The image processing device of claim 2, wherein the first selector sends the image data which has been enlarged by the reduction/enlargement unit to the correction unit when the image magnification is enlarging processing, and the second selector sends the image data corrected by the correction unit to the reduction/enlargement unit when the image magnification is reduction processing.

4. The image processing device of claim 1, wherein the correction unit operates as a reducing interpolation unit when the magnification is reduction processing, and the correction unit operates as an enlarging interpolation unit when the magnification is enlarging processing.

5. The image processing device of claim 1, wherein the correction unit comprises a filter circuit in which the parameters may be changed in accordance with the magnification.

6. The image processing device of claim 1, wherein the correction unit is a field programmable gate array.

7. An image processing device for processing input image data including a plurality of pixel data, the device comprising:
- a correction unit that corrects for image deterioration caused by changes in image magnification;
- a reduction/enlargement unit that, based on the magnification, thins out the pixel data when reduction is being performed or carries out inflation of the pixel data when enlargement is being performed; and
- a controller that changes the operation of the correction unit in response to the magnification, further comprising:
- a first selector that sends input pixel data to the reduction/enlargement unit when enlargement is being performed, and sends pixel data from the correction unit to the reduction/enlargement unit when reduction is being performed, and
- a second selector that sends pixel data from the reduction/enlargement unit to the correction unit when enlargement is being performed, and sends input pixel data to the correction unit when reduction is being performed, and
- a third selector that outputs pixel data from the correction unit when enlargement is being performed, and outputs pixel data from the reduction/enlargement unit when reduction is being performed.

8. An image processing device, comprising:
- a correction unit comprising a device that has a variable circuit construction so that the correction unit functions as a reduction correction circuit when reduction is being performed and the correction unit functions as an enlargement correction circuit when enlargement is being performed;
- a reduction/enlargement unit that thins out pixel data when reduction is being performed and inflates pixel data when enlargement is being performed; and
- a controller that changes the operation of the correction unit so that the correction unit functions as a reduction correction circuit when reduction is being performed and the correction unit functions as an enlargement correction circuit when enlargement is being performed, further comprising:
- a first selector that sends input pixel data to the reduction/enlargement unit when enlargement is being performed, and sends pixel data from the correction unit to the reduction/enlargement unit when reduction is being performed, and
- a second selector that sends pixel data from the reduction/enlargement unit to the correction unit when enlargement is being performed, and sends input pixel data to the correction unit when reduction is being performed, and
- a third selector that outputs pixel data from the correction unit when enlargement is being performed, and outputs pixel data from the reduction/enlargement unit when reduction is being performed.

9. The image processing device of claim 8, wherein the controller changes the operation of the correction unit so that when reduction is being performed the correction unit functions as a reduction correction circuit to correct image deterioration caused by the thinning out of the pixel data, and when enlargement is being performed the correction unit functions as an enlargement correction circuit to correct image deterioration caused by inflation of the pixel data.

10. The image processing device of claim 9, wherein the reduction correction circuit comprises a filter circuit in which the parameters are changed in accordance with the reduction ratio.

11. The image processing device of claim 10, wherein the enlargement correction circuit has multiple filter circuits, and one of the filter circuits is selected in accordance with the enlargement ratio.

12. The image processing device of claim 9, wherein the enlargement correction circuit has multiple filter circuits, and one of the filter circuits is selected in accordance with the enlargement ratio.

13. The image processing device of claim 8, wherein the correction unit comprises a filter circuit in which parameters may be changed in accordance with the magnification.

14. The image processing device of claim 8, wherein the correction unit is comprised of a field programmable gate array.

* * * * *